UNITED STATES PATENT OFFICE.

CARL JAGERSPACHER, OF BASEL, SWITZERLAND, ASSIGNOR TO SOCIETY OF CHEMICAL INDUSTRY IN BASLE, OF BASEL, SWITZERLAND.

AZO DYE AND PROCESS OF MAKING SAME.

No. 916,161.  Specification of Letters Patent.  Patented March 23, 1909.

Application filed July 22, 1908. Serial No. 444,871.

*To all whom it may concern:*

Be it known that I, CARL JAGERSPACHER, doctor of philosophy and chemist, a subject of the Emperor of Austria-Hungary, and resident of Basel, Switzerland, have invented new and useful Improvements in the Manufacture of Azo Dyestuffs, of which the following is a full, clear, and exact specification.

The invention relates to the manufacture of new amidoarylazimido-derivative of the sulfonic acids of 2:5-amidonaphthol, corresponding to the formula

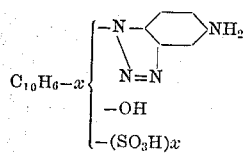

and of new azo-dyestuffs derived therefrom. These new amidoaryl-2-azimido-5-naphtholsulfonic acids are obtained by condensing the 2-naphthylamin-5-7-disulfonic acid or the 2-naphthylamin-1:5:7-trisulfonic acid with 2:4-dinitro-1-chlorobenzene, transforming the resulting dinitro compound by partial reduction into the corresponding paranitroortho-amidophenylbetanaphthylamin sulfonic acid, preparing with this latter by means of nitrous acid an azimido-compound and transforming, after reduction of the paranitro-group, the obtained paramidophenyl-2-azimido-naphthalene-sulfonic acid into the corresponding azimidonaphthol derivative by melting with caustic alkalies. For instance the preparation of the paramidophenyl-2-azimido-5-naphthol-7-sulfonic acid is shown by the following steps:

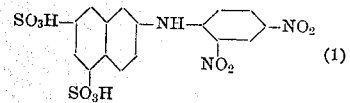

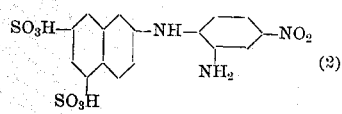

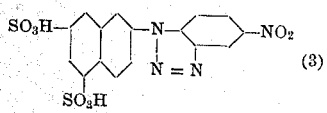

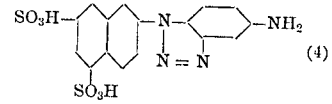

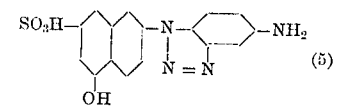

By the combination of the new amidoaryl-2-azimido-5-naphtholsulfonic acids with aromatic azo bodies, new azo-dyestuffs are obtained, which are soluble in water and dye unmordanted cotton in neutral or alkaline bath yellow-red to blue-red and violet-red tints. In consequence of the presence of a heteronucleal amido group in the molecule of these azo-dyestuffs, these latter can be diazotized on the fiber and developed thereon, by means of not sulfonated amins or phenols, as for instance betanaphthol, to red shades which are distinguished by their fastness to washing and by their brilliance.

The invention is completely illustrated by the following examples:

§I. Preparation of the New Amidoaryl-2-azimido-5-naphthol Sulfonic Acids.

(a) 104 kilos of 2-naphthylamin-5:7-disulfonic acid are dissolved by heating in about 600 liters of water and mixed with 40 kilos of crystallized sodium acetate and 60 kilos of 2-4-dinitro-1-chlorobenzene; the resulting mixture is heated for 8 to 10 hours in an apparatus provided with a reflux cooler. The condensation is terminated by adding gradually 16 kg. of soda and by bailing for 1 hour. After cooling, the separated sodium salt of the dinitrophenyl-2-naphthylamin-5:7-disulfonic acid is isolated by suction etc.

(b) For its partial reduction, 70.5 kilos of the dinitrophenylated acid thus obtained and corresponding to 34.7 kilos of 2-naphthylamin-5:7-disulfonic acid are mixed with about 120 liters alcohol. In the resulting paste is poured, eventually while cooling the vessel externally, a solution of 60 kilos crystallized sodium sulfid and of 13.2 kilos of ammonium chlorid in 30 liters of water, whereby the paste is gradually transformed into a red solution. Afterward the mass is heated to about 50° C., until a sample of the mass acidulated and filtered takes no longer a yellow coloration, but gives a red colored solution of the azimido compound, on treatment with a nitrite. The mass is then let to cool, the disodium-salt of the paranitroorthoamidophenyl - 2 - naphthylamin - 5:7 - disulfonic acid crystallizing hereby in the form of red laminas or the mass of reaction being transformed into a crystalline paste.

(c) The sodium salt of the paranitroorthoamidophenyl-2-naphthylamin-5:7-disulfonic acid, which has been separated, is dissolved in water and to the solution thus obtained are added first sulfuric acid and then gradually sodium nitrite, until paper impregnated with starch containing potassium iodid shows a permanent reaction. The thus obtained solution of the nitroazimido compound is then reduced by boiling it with iron filings and from the solution, liberated from iron by soda, the amidophenylazimidonaphthalene disulfonic acid is separated by adding hydrochloric acid. It constitutes gray needles and can be diazotized easily, giving a colorless diazo compound, sparingly soluble in water.

(d) In order to obtain the amidophenylazimido-5-naphthol-7-sulfonic acid from the amidophenylazimidonaphthalene - disulfonic acid obtained according to the paragraph (c), 150 parts of this latter product are heated with 150 parts of water and 300 parts of soda lye in an autoclave for about 2 to 4 hours at 190 to 200° C. The mass of the reaction is dissolved in water and acidulated with hydrochloric acid, the paramidophenylazimidonaphthol-7-sulfonic acid being thus precipitated as a gray crystalline powder. It is sparingly soluble in water and gives with nitrous acid a diazo compound also difficulty soluble, but combining easily with the components usually employed to the manufacture of azo-dyestuffs, thus furnishing yellow-red to blue-red and violet-red dyestuff. If the said diazo compound is poured in a solution of soda, it combines with itself, giving a claret-red dyestuff which dissolves difficultly.

§II. *Preparation of the Azo-Dyestuffs.*

Example I: 12.1 kilos of metaxylidin are diazotized in the usual way, with 30 kilos of sodium nitrite and 30 kilos of hydrochloric acid. The solution of metadiazoxylene is poured, while stirring, in a cooled solution of 36 kilos of paramidophenyl-2-azimido-5-naphthol-7-sulfonic acid made alkaline by soda, the dyestuff being formed immediately. The stirring having been continued for a certain time, the mass is heated to boiling and the dyestuff is separated, eventually after a little addition of common salt, by filtration, pressing and drying. It dyes unmordanted cotton blue-red tints turning by diazotizing on the fiber and developing by betanaphthol to brilliant scarlet-red shades fast to washing. If in this example the metadiazoxylene is replaced by diazobenzene, orthodiazotoluene and paradiazotoluene, dyestuffs are obtained giving by development with betanaphthol more yellow-red shades. The betadiazonaphthalene gives a claret-red, the paramidoacetanilid a violet etc.

Example II: 11.4 parts of metaazoxyanilin are diazotized in about 300 parts of water by adding 30 parts of hydrochloric acid and 7 parts of sodium nitrite. The resulting tetrazo derivative solution is poured in a solution of 36 parts of paramidophenyl-2-azimido-5-naphthol-7-sulfonic acid, made alkaline by soda, the separation of the dyestuff taking place immediately. It dyes unmordanted cotton orange shades. If instead of azooxyanilin, azooxytoluidin or azoxyanisidin be employed in this example the resulting products are more blue.

Example III: 11.4 parts of azoxyanilin are transformed into a tetrazo derivative, which is first combined in alkaline solution with 16 parts of 2:5-amidonaphthol-1:7-disulfonic acid to an intermediary product, which is transformed into a mixed tetrazo-dyestuff by adding a solution of 18 parts of amidophenyl-5-naphthol-7-sulfonic acid, made alkaline by soda. This dyestuff dyes cotton directly and by development with betanaphthol red tints. In analogous manner is effected the preparation of mixed tetrazo-dyestuffs, if, instead of 2:5-amidonaphthol-1:7-disulfonic acid, other amidonaphthol-sulfonic acids, naphthol sulfonic acids or acidylamidonaphthol-sulfonic acids be employed in the foregoing example.

What I claim is:

1. The described process for the manufacture of amidoarylazimidonaphthalene sulfonic acids, by condensing the naphthylamin sulfonic acids with 2:4-dinitro-1-chlorobenzene, reducing partially the resulting products of condensation, transforming the so obtained products of partial reduction by nitrous acid into azimido-compounds and finally treating the obtained nitroaryl-azimidonaphthalene sulfonic acids with reducing agents.

2. The described process for the manufacture of paramidophenyl-2-azimido-5-naphthol sulfonic acids, by condensing the 2-naphthylamin-5-7-disulfonic acid and its sulfo-derivative with 2:4-dinitro-1-chlorobenzene, reducing partially the resulting products of condensation, converting the thus obtained partially reduced products by nitrous acid into azimido compounds, treating these nitrophenylazimidonaphthalene sulfonic acids with reducing agents and finally melting the resulting amidophenylazimidonaphthalene sulfonic acid with caustic alkalies.

3. The described process for the manufacture of azo-dyestuffs by combining the amidophenyl-2-azimido-5-naphthol sulfonic acids with aromatic diazo bodies in alkaline medium.

4. The described process for the manufacture of azo-dyestuffs by condensing the 2-naphthylamin-5-7-disulfonic acid and its sulfo derivatives with 2:4-dinitro-1-chlorobenzene, reducing partially the resulting products of condensation, transforming their products of partial reduction by nitrous acid into azimido compounds, treating the nitrophenylazimidonaphthalene sulfonic acids thus obtained with reducing agents, melting the resulting amidophenylazimidonaphthalene sulfonic acids with caustic alkalies and finally combining the thus obtained paramidophenyl-2-azimido-5-naphthol sulfonic acids with aromatic diazo bodies in alkaline medium.

5. As new products, the described azo-dyestuffs derived from paramidophenyl-2-azimido-5-naphthol sulfonic acids, the said dyestuffs being soluble in water and dyeing unmordanted cotton in neutral and alkaline bath from yellow-red to blue-red and violet-red and having the property of developing well on the fiber by being diazotized thereon and ultimately combined with amins or phenols, furnishing shades which are distinguished by their brilliance and their fastness to washing.

In witness whereof I have hereunto signed my name this 11th day of July 1908, in the presence of two subscribing witnesses.

CARL JAGERSPACHER.

Witnesses:
  ERNST WAGNER,
  AMAND RITTER.